United States Patent
Lithicum et al.

(10) Patent No.: US 6,714,213 B1
(45) Date of Patent: Mar. 30, 2004

(54) SYSTEM AND METHOD FOR PROVIDING INTERACTIVE HAPTIC COLLISION DETECTION

(75) Inventors: Steven Eric Lithicum, Niskayuna, NY (US); Russell Scott Blue, Clifton Park, NY (US); Christopher Richard Volpe, Niskayuna, NY (US); Ricardo Scott Avila, Clifton Park, NY (US); James Vradenburg Miller, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 228 days.

(21) Appl. No.: 09/617,971

(22) Filed: Oct. 5, 2000

Related U.S. Application Data (60) Provisional application No. 60/158,489, filed on Oct. 8, 1999, provisional application No. 60/158,488, filed on Oct. 8, 1999, and provisional application No. 60/158,487, filed on Oct. 8, 1999.

(51) Int. Cl.[7] ............................................. G06T 15/00
(52) U.S. Cl. ..................................................... 345/701
(58) Field of Search ................................ 345/519, 520, 345/700, 701, 156; 318/561, 568

(56) References Cited

U.S. PATENT DOCUMENTS

| | | | | |
|---|---|---|---|---|
| 5,590,062 A | * | 12/1996 | Nagamitsu et al. ............ | 703/6 |
| 5,694,013 A | | 12/1997 | Stewart et al. ................ | 318/561 |
| 5,737,505 A | | 4/1998 | Shaw et al. ................... | 395/119 |
| 5,802,353 A | | 9/1998 | Avila et al. ................... | 395/500 |
| 5,825,308 A | * | 10/1998 | Rosenberg .................... | 341/20 |
| 5,844,392 A | | 12/1998 | Peurach et al. ........ | 318/568.17 |
| 5,956,016 A | | 9/1999 | Kuenzner et al. ............ | 345/156 |
| 5,984,880 A | | 11/1999 | Lander et al. ............... | 600/595 |
| 5,999,168 A | | 12/1999 | Rosenberg et al. .......... | 345/161 |
| 6,262,738 B1 | * | 7/2001 | Gibson et al. ............... | 345/419 |
| 6,349,301 B1 | * | 2/2002 | Mitchell et al. ............ | 707/101 |

OTHER PUBLICATIONS

Three Brand New Trackers From Ascension Technology Corporation, pp. 1–3 and 1–7, printed Jul. 26, 2000 from internet web site (www.ascension-tech.com).

William A McNeely, KD Puterbaugh, JJ Troy, "Six Degree-of-Freedom Haptic Rendering Using Voxel Sampling", Boeing Company, 8 pages, 2001.

* cited by examiner

*Primary Examiner*—Phu K. Nguyen
(74) *Attorney, Agent, or Firm*—Jean K. Testa; Patrick K. Patnode

(57) ABSTRACT

The present invention is directed toward providing interactive haptic collision detection between a stationary and a moving object in a virtual reality environment. A user grasps the arm of a haptic device and manipulates an object as viewed on a virtual reality display. As any portion of the manipulated object comes too close to the surface of the stationary object, the haptic device imposes feedback forces against the user's efforts that increase in magnitude as the user manipulates the object beyond a force boundary proximate to the surface of the stationary object. The feedback forces are applied directionally in line with the shortest path between the surfaces at risk of collision. Several measures can be implemented by the user to reduce the computation load involved in constantly comparing the distances between points on the surface of the movable object and points on the surface of the stationary object without seriously compromising the collision detection and avoidance functions of the system. Furthermore, while the invention provides for up to six degrees of freedom for manipulating objects and providing haptic feedback, the system also accommodates three degrees of haptic freedom and feedback, with the additional three degrees of rotational feedback being provided visibly or audibly.

4 Claims, 4 Drawing Sheets

SYSTEM AND METHOD FOR PROVIDING INTERACTIVE HAPTIC COLLISION DETECTION

CROSS REFERENCE TO RELATED APPLICATIONS

Continuity Statement

This application is related to Provisional Applications U.S. Serial Nos. 60/158,489, 60/158,488 and 60/158,487, all three filed Oct. 8, 1999, in the U.S. Patent and Trademark Office, the contents of which are incorporated herein by reference, and the benefit of priority to which is claimed under 35 U.S.C. 119(e).

BACKGROUND OF INVENTION

The present invention relates generally to systems for providing tactile feedback. More specifically, the invention relates to haptic interfaces for providing physical, visual, and auditory feedback to users manipulating objects in a virtual environment.

Virtual reality technologies have expanded in recent years well beyond the entertainment realm of amusement games and fantasy lands to the more commercial fields of product development, testing, and training. One particularly dynamic field of application for virtual reality technologies is the environment of haptic interfaces. Haptics is the field of tactile feedback in which a resistance force is applied in response to and against a user-initiated movement, which thereby imparts a sensation of touch to the user. By programming a computer with the space, surface, and location parameters of a predetermined space and/or object, a user of a haptic interface can simulate or model a sensation of "feeling" a particular object or manipulating the object in space without actually touching the surface or the object itself. Such a system is disclosed in U.S. Pat. No. 5,999,168 to Rosenberg, et al. Another haptic system is described in U.S. Pat. No. 5,802,353 to Avila, et al., one of the inventors of the present invention.

Figure 1:
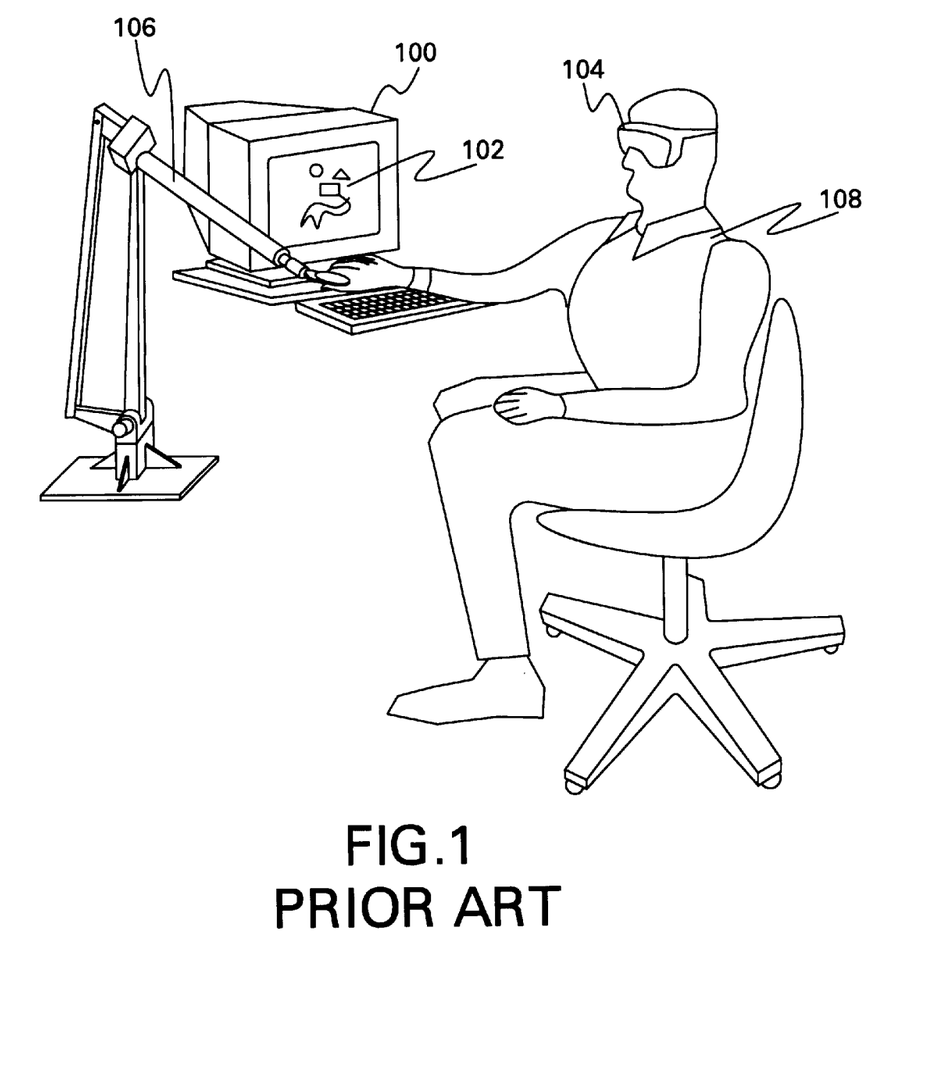
FIG. 1 shows the apparatus of an existing haptic interface system.

The haptic interface actually includes a broader range of equipment than is typically associated with a computer interface. FIG. 1 shows a typical haptic interface system that includes a computer or processor 100 with memory (not shown) for storing space, location, and resistance data associated with a given object(s) or space. Connected to the computer is a display screen 102 for viewing the manipulated object in virtual space. The user 108 grasps a haptic device 106, which is typically an articulated arm with sensors to detect at least three directions of movement, also known as three degrees of freedom. Therefore, when the user 108 manipulates the object in virtual space by moving the haptic device 106, the sensors detect the combined movement in the three degrees of freedom, communicate the movement to the computer 100, which in turn translates the haptic device movement into actual movement of the object as displayed on the screen 102. Although haptics feedback force cannot presently be experienced merely by viewing the object in virtual space, the virtual effect of the object movement can be viewed by the user 108 on the display screen 102 or, alternatively, through a user headset with goggles 104. As the object is moved in virtual space toward another object or an edge of the virtual space by operation of the haptic device 106, the computer 100 detects when the relative spaces occupied by the objects coincide, thus detecting a collision, and directs the motors in the haptic device 106 to resist further movement by the user 108 in the direction of the collision, thereby providing tactile feedback to the user 108 that the objects are in virtual contact.

Present haptic systems are directed toward product development and testing environments, such as the automotive CAD field disclosed in U.S. Pat. No. 5,694,013 to Stewart, et al., in which an object is manipulated within a virtual space representative of an actual or planned physical environment. However, such systems are limited to determining whether or not a collision has actually occurred between the object and a component within its virtual space. Unfortunately, in the real world, collisions are to be avoided and near-collisions should be learned from, which is not the direction that many of the present haptic interface systems have taken.

Early haptic systems were limited to three degrees of freedom. With more powerful computers, increased memory, and more sophisticated haptic devices, a rotational or torque motion can now be applied within each of the three directions of movement, thereby increasing the degrees of freedom available from the haptic device to six. However, to leap from three to six degrees of freedom is very expensive, not only in the design and commensurate complexity of a six degree of freedom haptic device, but also in the increased number of motors from three to six. A haptic interface system that can provide six degrees of freedom without significantly increasing the equipment cost and complexity would be desirable.

Sophisticated haptic interfaces that accommodate the manipulation of complex polygon objects in a virtual space often rely on continuous polygon versus polygon intersection tests, which constitute an immense computational load on the computer 100. Presently, the standard for haptic interface systems is to test whatever is being moved for collision with a stationary article or environment at one thousand times per second, or at 1,000 Hz. The advantage of maintaining at least the 1,000 Hz standard is a more realistic sensation from the haptic device in the form of a smooth rather than jerky or intermittent resistance to the user's movements. As the objects being subjected to movement within haptic systems become more complex, the computer 100 must become correspondingly faster and, often, more expensive and physically larger. Despite the huge advances in the capacity of personal computers, the computer processing power required to maintain the 1,000 Hz standard is often beyond the resources of reasonably-priced and configured personal computers. It would be desirable to provide a haptic interface system that could accommodate the virtual manipulation of intricate objects in a complex environment on a personal computer.

The preferred embodiments of the present invention overcome the problems associated with existing haptic interface systems.

SUMMARY OF INVENTION

The present invention is directed toward a haptic interface for detecting and avoiding collisions between objects in a virtual space in which a user can manipulate one or more objects relative to a fixed object. As the user moves an object that is proximately close to another object, haptic feedback forces provide resistance against the user's attempted manipulation of the movable object that would result in a contact or collision between the movable object and the stationary other object. One example of the use of such a system would be a modeled disassembly of an aircraft engine in which the user grasps an engine part in virtual space and attempts to remove the component from the engine without colliding with any other portion of the engine. The resistance provided by the present invention not only signals to the user that the part being removed is approaching close proximity with another part of the engine but also indicates, with very high resistance, that the part cannot be removed along the path selected by the user without colliding with some part of the engine. During the virtual manipulation, the user may view the interaction of the objects on a display screen and/or through a head-mounted display.

The present haptic interface relies on a simple intersection comparison to test for an impending or actual collision between objects in the virtual space as opposed to the more complex polygon versus polygon collision test that is typically employed to detect collisions in haptic systems. By establishing a series of points and surface vectors representing each object, the present system can easily and quickly determine impending collisions and actual collisions by analyzing vectored distances between approaching object surfaces.

In an alternate embodiment of the invention, the haptic interface can provide feedback associated with six degrees of freedom without the additional expense and complexity typically associated with expanding from three to six degrees of freedom that add the three rotational torques to the feedback system. Instead of relying on additional motors in the haptic device to provide feedback forces associated with rotational degrees of freedom, the present invention communicates these degrees of freedom to the user in the form of sound and/or visual signals.

BRIEF DESCRIPTION OF DRAWINGS

These and other objects and advantages of the present invention will become more apparent and more readily appreciated from the following description of the preferred embodiments, taken in conjunction with the accompanying drawings, of which.

DETAILED DESCRIPTION

Figure 2:
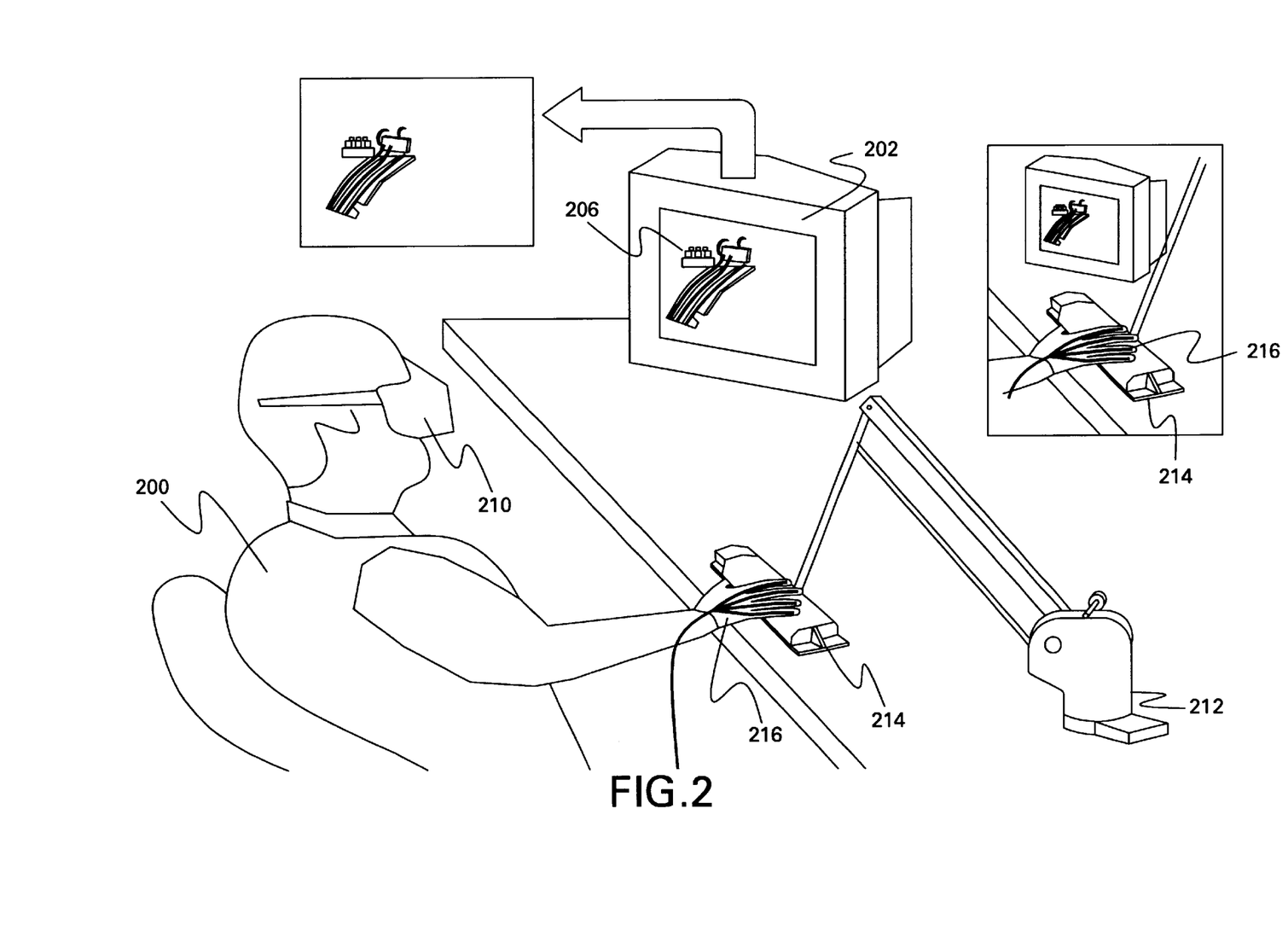
FIG. 2 shows the apparatus of an embodiment of the haptic interface system of the present invention.

Referring now to FIG. 2, there is illustrated the apparatus of an exemplary configuration of the present invention. A user 200 initiates the haptic experience by first selecting on the computer 202 through one of any number of well known computer interfaces, such as a keyboard (not shown), mouse (not shown), touch screen 208, or voice activation unit (not shown), a physical primary object to be manipulated. The item is selected from a list of displayed objects whose shape, size, and configuration have previously been stored in the memory of the computer, as will be discussed more thoroughly below. Upon selecting the primary object, an image of the selected primary object is displayed to the user on the screen 208 or through a head-mounted display 210, such as virtual reality goggles. Head mounted displays are known to be available through Virtual Research Systems, Inc. of Santa Clara, Calif. The user may rotate, zoom, and manipulate the displayed primary object, through well known CAD techniques, to display a desired surface, view, or component. The user 200 then selects a movable component of the primary object. For example, the primary object selected by the user could be an aircraft engine, and the movable object could be a fuel injector pump of the engine. The user 200 may select the movable object through one of several options. The user 200 can select from a list of movable objects displayed on the screen 208/210 by the system as a result of the user's selection of the primary object. In the alternative, the user could click with a mouse the movable object as displayed on the screen 208 or head-mounted display 210 as a portion of the primary object. The user also has the option of "clipping" the primary object to reduce processing time by excluding from collision testing unnecessary portions of the primary object. For example, if the movable fuel injector pump is located on the right side of the engine as viewed in virtual space, the user can "clip off" the left side of the primary object, thereby eliminating the surface area on the left side of the engine for subsequent collision testing. While the "clipped" portion of the primary object is optionally still viewable through the virtual display 208/2210 (possibly with a different color to indicate its "clipped" status), its surfaces will not be considered as collision sources during the subsequent manipulation of the movable object (fuel injector pump).

Also connected to the computer 202 and the display 208/210 is a haptic device 212 which comprises an articulated arm, sensors detecting up to six degrees of freedom, and motors for providing tactile feedback in the form of force against the user's movement of the arm in up to three translational directions and up to three rotational torques. One such haptic device is marketed under the PHANTOM™ name by SensAble Technologies of Woburn, Mass. Optionally attached to the end of the haptic arm in the present invention is a representation 214 of the movable object selected to be manipulated. The representation or mock-up of the object can easily be automatically produced by the system as a stereolithography (hereinafter "STL") representation of the object Attached to the user's hand is a data glove 216, by which the user grasps either the end of the haptic device 212 arm or the STL mock-up of the object 214 attached to the arm. Such a glove is currently available under the product name CyberGlove™ from Virtual Technologies, Inc. of Palo Alto, Calif. The sensors in the data glove 216 track the motion of the user's fingers and hand as the user conforms his/her hand to the shape of the object 214. As the user reaches for and manipulates the object 214 through the virtual space, the displayed scene of the combined hand/object/surroundings image is updated to reflect both the movement of the user's hand grasping the object 214 and also the perspective view as the user 200 changes his/her orientation while looking through the head-mounted display 210. Components utilized in contemporary virtual tracking systems have been available through Ascension Technology Corporation of Burlington, Vt. Next, the user 200 registers the movable object in the system, either by grasping the movable object in the virtual display through manipulation of the data glove 216 or by rotating the STL object 214 to align the corresponding virtually displayed movable object and pressing a function key on the computer 202 to synchronize the alignment of the virtual movable object with the present sensor readings in the haptic device 212. Thereafter, any physical movement by the user 200 of the data glove 216 or the haptic device 212 will be displayed on the virtual screen 208/210 as a movement of the "hand" of the user grasping the virtual movable object within the environment of the primary object. In an alternate embodiment, the user 200 may manipulate two haptic devices 214, one with each hand. In such an environment, the user 200 can use both hands to extract the movable object from the primary object, or the user 200 can manipulate a virtual tool, such as a wrench, with one hand while grasping the movable object with the other hand. In yet another embodiment of the invention, the user 200 may be "wearing" two data gloves 216 in conjunction with a single haptic device 212 such that both hands would be present in the virtual reality but would be grasping a single object 214.

One application of the present invention is a virtual maintenance training environment in which technicians and mechanics can disassemble and assemble a device, such as an aircraft engine, in virtual space. Through such practice sessions, technicians can become proficient at maintenance procedures, and new maintenance procedures can be developed and tested anywhere in the world—all without having an actual aircraft engine on site. Training on new and updated devices could be easily implemented merely by loading the digital space representations of the new and updated devices and their component parts into the haptic computer 200, as discussed below.

Prior to implementation of the above haptic processing and virtual object manipulation, the relative space and surface representations of the primary and movable objects and the interior volume must be first calculated and stored in the computer 200. Referring now to the flow chart of FIG. 3, a static volume called a bounding box is first constructed at step 300 as the smallest rectangular volume that will encompass the primary object. The bounding box is divided into very small cubes at step 302 by extending lines at equal intervals along the box's x, y, and z axes. A series of evenly distributed points is thereby established within the box and on the surface of the box at the intersection of any two x, y, or z lines. The rectangular space centered on each of these evenly distributed points and sized by the x, y, and z lines is called a voxel.

Figure 3:
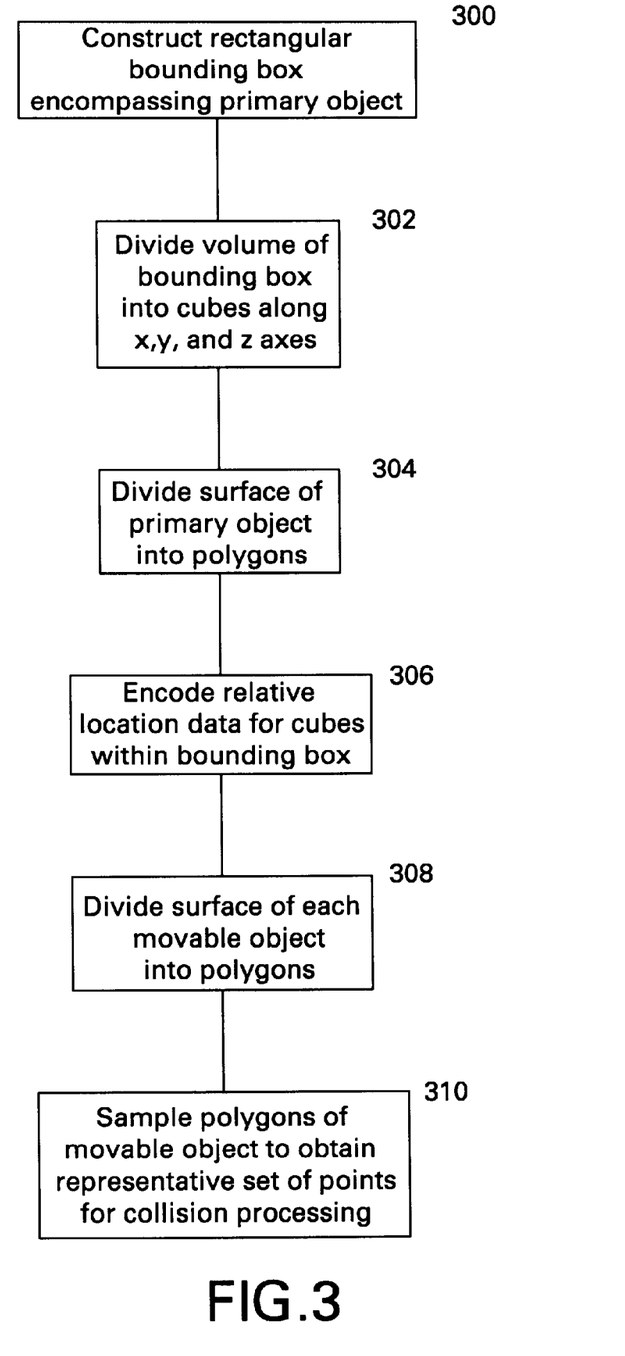
FIG. 3 is a flow chart of the registration of the space occupied by the primary object and the surface of the primary and movable objects.

The entire surface of the primary object is sectioned off at step 304 into very small polygons, each such polygon being a tiny triangle representing a flat surface region on the surface of the primary object. At step 306, relative location data is encoded for every voxel within the volume of the bounding box. This data consists of two elements for each voxel; namely the distance between the center point of the voxel and the closest point on the surface of the primary object, and a normal vector representing the direction from the center point of the voxel to this closest point on the surface of the primary object. For example, if the relative location data is in the format of a sixteen (16) bit variable, the distance portion of the variable may be allocated as bits 0–4 of the variable, and the direction portion may be bits 5–15, where the direction values indicate indexes into a direction vector lookup table. Although the location data may be represented by any size variable, with the above variable allocation scheme, the system permits thirty-two (32) different values for the distance portion of the location data. The distance data also indicates whether a point is inside the primary object or located exterior to the surface of the primary object. One means by which the system determines the location of the point relative to the surface of the primary object is by the sign of the variable, with a negative sign indicating the point is located in the interior of the primary object. Alternatively, a value range, say from 0 to 5, may represent distances for points located within the primary object; a range from 6–11 may represent distances for points located exterior to the surface of the primary object, and values from 12–31 may represent larger distances, regardless of whether the voxel is located inside or outside of the primary object. In this latter case, during operation of the invention, the system detects when the movable object "crosses" the surface of the primary object and thereby knows whether the voxel in question is within or exterior to the primary object.

Additionally, for those points that are located further than a predetermined or user-selected distance away from the nearest surface of the primary object, the corresponding relative location data may be encoded with a "faraway" designation, such as a bit representation of all zeros. Since the present invention is concerned with detecting and avoiding collisions, the present system is more concerned with points in space for which a collision is a risk; namely those points close in distance to the surface of the primary object. Points further away from the surface of the primary object, whether inside or outside the primary object, do not represent the same risk for collision. Therefore, points encoded with a "faraway designation" may be ignored by the present system during collision detection processing to save processing time. Furthermore, large portions of space will likely be "faraway," and the space representation data for these portions can be compressed since the distance/direction values will be the same as discussed above, thereby reducing the memory demands of the present inventive system.

At step 308, the entire surface area of every movable object or component (which may become a future movable object) on the primary object is sectioned off into small polygons, each such polygon being a tiny triangle, and each triangle representing a flat surface region on the surface of the movable object or component. Finally, at step 310, the polygons comprising the surface of the movable object are evenly sampled to generate a predetermined number of points on the surface of the movable object that are representative of the movable object for use in the haptic collision processing of the present invention. The number of points to be generated is based on the speed of the processor being used by the system, with faster processors being capable of handling more points in a given amount of time.

In the preferred embodiment of the invention, the size and shape of both the movable object and the data glove 216 are registered in the system. Therefore, when the user grasps the object in virtual reality or grasps the STL representation 214, the system recognizes that both the object and the user's hand grasping the object exist in the virtual space vis-a-vis the primary object. As the user manipulates the object with his/her hand, the system determines the distance between the combined hand-object and the primary object and activates haptic feedback as the combined hand-object approaches or collides with a primary object surface. In this manner, the system reflects the reality of requiring sufficient space in and around the primary object for a technician to grasp a part with his/her hand and extract the part. As a further feature of the present invention, a library of different size hands (not shown) may be maintained for user selection to determine whether the user with a smaller or larger hand could perform the movement.

Each movable object has a series of hand tools defined for the object and registered in the system. Each defined tool is either required or helpful in removing the movable object from the primary object, such as a wrench to remove bolts holding the movable object in place on the primary object. Upon selection of a movable object by a user 200, a series of icons, one for each tool that can be used with the movable object, is displayed on the screen 208/210 to the user 200. By touching or clicking on the icon, a scale-sized tool is displayed in the virtual space for use by the user 200 in extracting the object. For example, the user 200 may select a socket wrench, select the desired socket head for the wrench, such as 11 mm, and grasp the wrench. The user 200 would then manipulate the tool in the virtual space to, for example, remove a bolt. The system would have been initialized with information regarding the size of the bolt, the amount of force necessary to loosen the bolt, and the number of turns required to remove the bolt. The haptic interface would then apply the commensurate amount of resistance to the user 200 through the haptic device 212 and data glove 216 to represent the force necessary to remove the bolt. The processor would detect the number of iterations of the wrench by the user 200 and would display the bolt as removed once the user 200 has rotated the bolt the requisite number of turns in the virtual space. As an option, the user 200 can select the shortcut of having the system remove any fasteners holding the movable object in place. Under this option, any bolts, screws, brackets, etc. would disappear from the display 208/210 upon being selected by the user 200, and the user 200 could then grasp the movable object as described above and begin the removal process.

Upon grasping the movable object and initiating the movement of the movable object from its location on/in the primary object in virtual space, the haptic interface of the present system is activated to test each of the points on the surface of the movable object for a distance to the respective nearest points on the primary object. Fast collision detection, as discussed more thoroughly below, between the primary object and the movable object is achieved in the present embodiment of the invention by transforming sample points evenly distributed on the surface of the movable object into the volume of the bounding box, thereby establishing the distance and direction to the surface of the primary object and determining if the movable part is close to or in contact with the primary object. The process of the present invention is therefore a rapid intersection test solved by point-by-point lookup as opposed to the polygon versus polygon intersection test that has been commonly used to perform intersection/collision tests.

Figure 4:
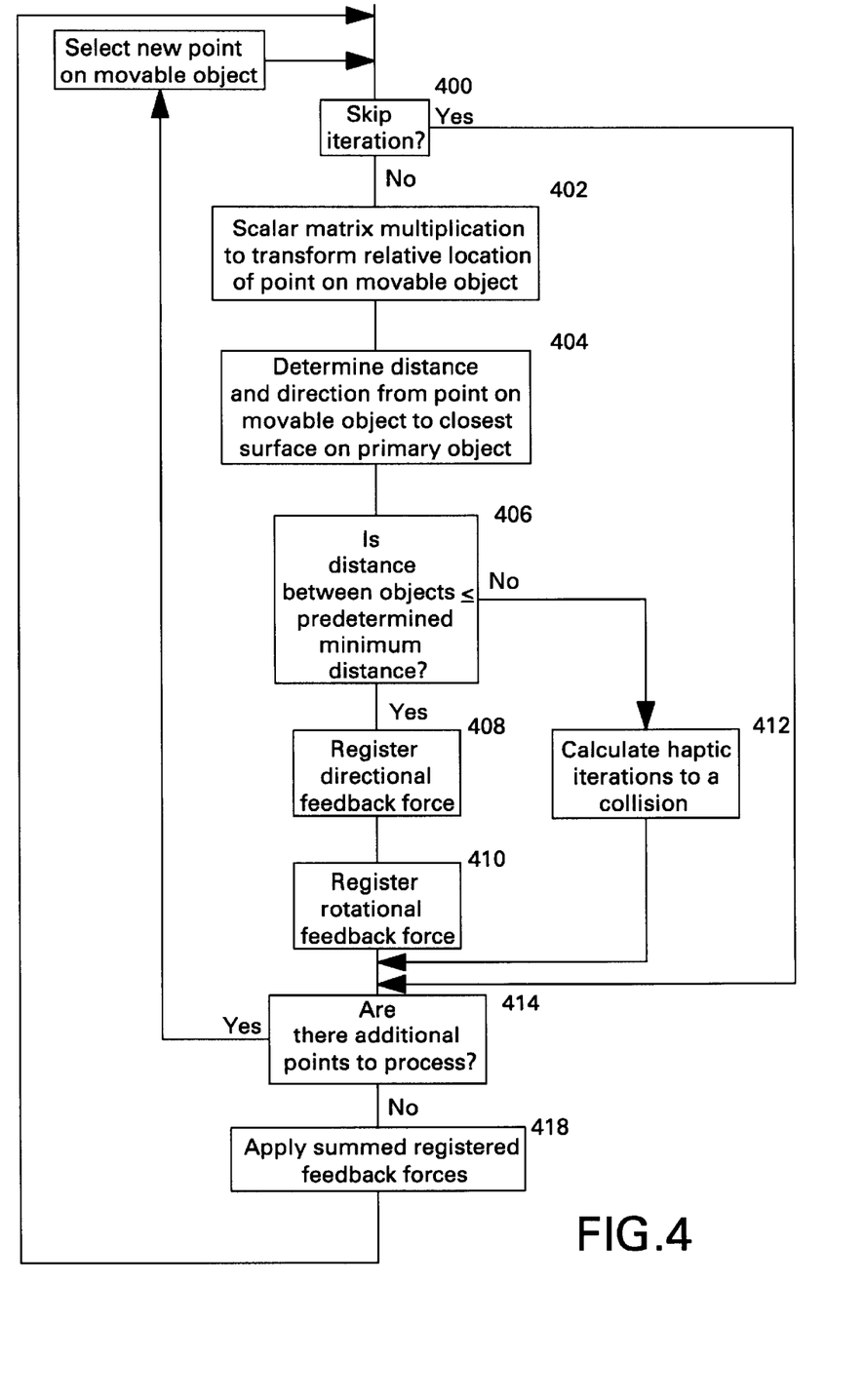
FIG. 4 is a flow chart of the collision proximity detection process.

In particular, and referring now to the flow chart of FIG. 4, the collision avoidance process with point by point proximity testing of the present invention will be explained. Upon detecting movement of the movable object from its initial, or prior, location, the collision avoidance process as shown in FIG. 4 is initiated by the system. At step 400, the system checks to determine whether an iteration for the point under consideration on the movable object may be skipped, as discussed more thoroughly below as regards step 412. For each point on the surface of the movable object that is not skipped, the system performs a matrix multiplication function at step 402 that represents the movement along the x, y, and z axes of that point on the movable object from its initial location. The multiplication transforms the movement of the movable object into the fixed volume of the bounding box to determine the new position of the point on the movable object relative to the surface of the primary object. The resultant scaled x, y, and z indices from the matrix multiplication function represent the coordinates of that point in the bounding box coinciding with the new location of the point on the movable object. Since all such points in the fixed volume have had their relative distances and vectors (with the exception of "faraway" points) to the nearest surface on the primary object encoded, the new distance and vector of the point on the movable object to the closest surface on the primary object is immediately known at step 404. This data is compared at step 406 to a predetermined minimum distance to the surface that represents the threshold collision warning distance, or the "force boundary" at which haptic resistance forces or indicators are initiated. If the present distance between the movable object and the primary object is equal to or less than the minimum distance, a directional feedback force for the haptic device is registered in a direction opposite from the vector of the point that has violated the minimum distance (step 408). The further the distance the point on the movable object is located inside, or penetrates, the force boundary, the stronger will be the directional feedback force that is registered. While the force boundary is often set at the surface of the primary object, this boundary may be set outside the surface of the primary object as an additional safety cushion for collision avoidance. The force boundary may even be set inside the primary object at a negative distance from the primary object's surface and thereby provide more space in which to manipulate the movable object before triggering any feedback forces. The registered feedback force is added to a summed cumulative directional feedback force value for the movable object as a whole.

If the system is calculating all six degrees of freedom, the rotational feedback force is calculated at step 410. As part of this process, the system first establishes, as a linear force vector, the direction vector encoded as part of the relative location data for the voxel containing the point which is under consideration on the movable object. A second vector, a torque arm, is determined from the point on the surface of the movable object to the geometric center of the movable object's axis-aligned, minimum bounding box. The axis of the rotational force is perpendicular to the plane formed by the linear force vector and the torque arm and runs through the aforementioned geometric center of the movable object's bounding box. The rotational feedback force is then registered for the point on the movable object. As with the directional feedback forces, the registered rotational feedback force is then added to a summed cumulative rotational feedback force value for the movable object as a whole.

At step 412, the system calculates, for each point not in pending collision, the minimum number of haptic iterations (steps 400–410 for each point constitute an iteration) until the distance between the movable object and the primary object could be at or less than the minimum threshold distance. This calculated number, or "skip count," represents the number of haptic iterations which can be skipped for these respective points, thereby saving the computational load, and not risk a collision. The use of the skip count in step 400 above presumes a maximum rate at which the movable object is moved toward the surface of the primary object. At step 414, the system determines whether there are additional points on the movable object to be processed. If so, a new point on the movable object is selected for collision detection processing at step 416, and the iterative process continues.

When all points have been processed for collision detection for the movable object in a given location, the registered forces summed in steps 408 and 410 are applied at step 418 to the haptic device 212 to initiate a summary feedback force against the haptic device 212 as manipulated by the user 200 (of FIG. 2). These directional and rotational forces continue as long as the point(s) on the movable object is at or within the predetermined minimum threshold distance to the nearest surface of the primary object (i.e., inside the force boundary). The forces will change direction and magnitude as the point on the movable object is manipulated within the force boundary. If a point on the movable object is moved outside the minimum threshold distance, the feedback forces applied for that point are eliminated. However, if the movable object is manipulated by the user 200 to further penetrate the force boundary, the feedback force supplied by the haptic device 212 is increased proportionally to the distance from the force boundary. In other words, the more the user 200 moves the movable object to a point of collision and beyond with the primary object, the greater the feedback force supplied by the haptic device 212 against the user's hand that is holding either the haptic device s arm or the STL representation 214 of the movable object. The above matrix multiplication, comparison, and activation/deactivation of feedback forces continues for all points on the surface of the movable object. As such, therefore, the collision testing and avoidance measures of the present invention as shown in FIG. 4 are both interactive and continual as long as the movable object is being manipulated in the virtual space of the present invention.

A further technique to minimize the computational load on the system without compromising the collision detection process is to reorder the points being processed in steps 400–410 as a function of the distance between the points and their respective closest primary object surfaces. Those points with the smallest distance to a collision would be processed first since these are the points where the greatest risk of collision lies. If some points on the surface of the movable object are not processed while the system strives to maintain the standard of 1,000 Hz, the "best" points to drop from the collision processing would be those movable object surface points that do not represent a risk or represent the smallest risk of a pending collision because of their relatively large distance from the surface of the primary object. The user 200 also has the option of specifying a finite number of points, for example 1,000 points, along the surface of the movable part against which to apply the above collision testing. The number of points tested is a tradeoff between an accurate representation of the moving part and the computational load to handle each point on the surface of the moving part.

The user 200 can specify variable feedback forces and minimum threshold distances for particular points on the surfaces of either the movable object or the primary object, or both. In this manner, more sensitive portions of the respective objects can be given a greater or lesser zone and effect of collision protection. For example, a portion of the surface of the exemplary aircraft engine containing delicate electronic parts can be given a larger distance of protection and/or a greater feedback force so as to better protect the electronic parts from being damaged by a collision with the fuel injector pump being removed for maintenance.

In an alternate embodiment, the present invention can provide feedback of a pending collision to the user 200 in six degrees of freedom without the equipment expense typically associated with migrating from three to six degrees of freedom in a haptic interface system. Instead of relying on motors in the haptic device 214 to impart a rotational force aligned with up to three directions of movement, the present invention can rely on visual and/or audible means to communicate the need to rotate a movable object to avoid a collision. For example, a roll rotation can be indicated by the sound of a drum roll; a pitch rotation can be indicated by a sound which changes in pitch (frequency); a yaw rotation can be indicated by a change in the stereo balance between left and right channels. Increased proximity between the movable and primary objects, which would normally be indicated by an increased feedback force through the haptic device 214, can be signaled to the user by an increase in pitch, volume, or stereo imbalance. A visual indicator of a pending collision that is being threatened because of torque being applied to the movable object can be indicated to the user 200 by fixing the movable object in the virtual space and spinning a transparent version of the movable object in the displayed virtual space around the axis that is risking the collision.

The present invention also provides for object path planning by recording the path taken by the movable object as the user 200 moves it out and away from the primary object. By recording the collision-free path the movable object has taken away from the primary object, a desired or optimum path can be charted for future training sessions. In such an embodiment, not only can the present system warn the user of an impending collision through the tactile and/or visual/audible feedback of the haptic interface, it can also implement haptic feedback should the user wander off the optimum removal path for the movable object. Such path planning can be implemented in actual, physical object movement, such as in actual aircraft engine maintenance. In such a system, a camera can digitally record the removal of the part and compare its movement in real time to the optimum removal path as determined above. Upon detecting that the object is being removed along a non-optimum or collision-prone path, the system can generate a warning visually, audibly, or through tactile feedback.

Although preferred embodiments of the present invention have been shown and described, it will be appreciated by those skilled in the art that changes may be made in these embodiments without departing from the principle and spirit of the invention, the scope of which is defined in the appended claims and their equivalents. For example, while the invention has been described as processing the relative distances between the surface of a primary object and the surface of a movable object, the invention would work equally well in an environment in which two or more objects are in motion.

What is claimed is:

1. A method for avoiding collisions between objects moving in virtual space, comprising:

manipulating a movable object in virtual space in at least one direction of movement;

calculating the distance and direction between the manipulated movable object and another object in the virtual space;

providing haptic feedback as the calculated distance closes to a predetermined minimum value;

increasing the haptic feedback as the calculated distance diminishes from the predetermined minimum value; and dividing the virtual space into cubes, delineated by lines along x, v, and z axes;

dividing the surface of the other object into polygons;

calculating the distance between the center of each cube and the nearest polygon on the surface of the other object; and determining a direction vector from the center of each cube to the nearest polygon on the surface of the other object.

2. The method according to claim 1, wherein the calculated distance comprises:

the distance from the center of a cube located within the other object;

the distance from the center of a cube located exterior to the other object; or a designation indicating the center of a cube is located a far distance from the surface of the other object.

3. The method according to claim 1, wherein the haptic feedback is increased to a level that blocks manipulation of the movable object toward the other object as the movable object approaches a collision with the other object.

4. The method according to claim 1, further including the step of minimizing the calculating by implementing one or more of the following steps:

clipping off unnecessary portions of the other object in the virtual space;

aligning a rectangular bounding box encompassing the other object in a minimum volume for determining the distance and direction between the movable object and the other object;

ignoring those points within the bounding box that are not within a predetermined distance from the surface of the other object; and skipping the distance and direction calculating for points on the movable object which are outside the predetermined minimum distance value from the other object.

* * * * *

UNITED STATES PATENT AND TRADEMARK OFFICE
CERTIFICATE OF CORRECTION

PATENT NO. : 6,714,213 B1
DATED : March 30, 2004
INVENTOR(S) : Steven Eric Linthicum et al.

It is certified that error appears in the above-identified patent and that said Letters Patent is hereby corrected as shown below:

<u>Title page,</u>
Item [75], Inventors, first named should read -- Steven Eric Linthicum --

Signed and Sealed this

Sixth Day of July, 2004

JON W. DUDAS
*Acting Director of the United States Patent and Trademark Office*